United States Patent
Betti et al.

(10) Patent No.: US 9,272,211 B2
(45) Date of Patent: Mar. 1, 2016

(54) METHOD AND SYSTEM TO PROVIDE LOCATION-BASED COMPETITIVE GAMES, TOURNAMENTS, PRIZES AND HIGH SCORE REPORTS VIA MOBILE DEVICES

(71) Applicants: Jonathan Betti, Hull, MA (US); David Miller, Monticello, IN (US); Robert S. DeKett, Hatboro, PA (US)

(72) Inventors: Jonathan Betti, Hull, MA (US); David Miller, Monticello, IN (US); Robert S. DeKett, Hatboro, PA (US)

(73) Assignee: Lomoga, LLC, Canton, MA (US)

( * ) Notice: Subject to any disclaimer, the term of this patent is extended or adjusted under 35 U.S.C. 154(b) by 0 days.

(21) Appl. No.: 13/871,459

(22) Filed: Apr. 26, 2013

(65) Prior Publication Data

US 2013/0331192 A1 Dec. 12, 2013

Related U.S. Application Data

(60) Provisional application No. 61/656,649, filed on Jun. 7, 2012.

(51) Int. Cl.
*A63F 9/24* (2006.01)
*A63F 13/30* (2014.01)
*A63F 13/216* (2014.01)
*A63F 13/795* (2014.01)
*A63F 13/92* (2014.01)
*A63F 13/798* (2014.01)
*G07F 17/32* (2006.01)

(52) U.S. Cl.
CPC ............... *A63F 13/12* (2013.01); *A63F 13/216* (2014.09); *A63F 13/795* (2014.09); *A63F 13/798* (2014.09); *A63F 13/92* (2014.09); *G07F 17/3237* (2013.01)

(58) Field of Classification Search
CPC ....... A63F 13/12; A63F 13/33; A63F 13/332; A63F 13/335; A63F 13/69; A63F 13/87; A63F 2300/204
USPC ..................................................... 463/9, 29, 42
See application file for complete search history.

(56) References Cited

U.S. PATENT DOCUMENTS

| | | | |
|---|---|---|---|
| 8,221,241 B2* | 7/2012 | Davis et al. ...................... 463/42 |
| 2006/0035707 A1* | 2/2006 | Nguyen et al. .................. 463/29 |
| 2007/0202941 A1* | 8/2007 | Miltenberger et al. ......... 463/25 |
| 2009/0017913 A1* | 1/2009 | Bell et al. ........................ 463/40 |

FOREIGN PATENT DOCUMENTS

WO WO 2013155609 A1 * 4/2012

* cited by examiner

*Primary Examiner* — Steve Rowland
(74) *Attorney, Agent, or Firm* — Sofer & Haroun, LLP

(57) ABSTRACT

A system is provided for implementing a location specific gaming event having a server and databases for maintaining a plurality of user accounts and for maintaining location information. The server and databases maintain at least one affiliate account with at least one geographic location. The system is configured to receive at least one request from the at least one affiliate account to arrange for a location specific gaming event at the geographic location associated with the affiliate account. The system is further configured to receive at least one communication from mobile devices of at least two users when the mobile devices are located at the geographic location, the server of the system configured to administer the location specific gaming event to the users.

16 Claims, 10 Drawing Sheets

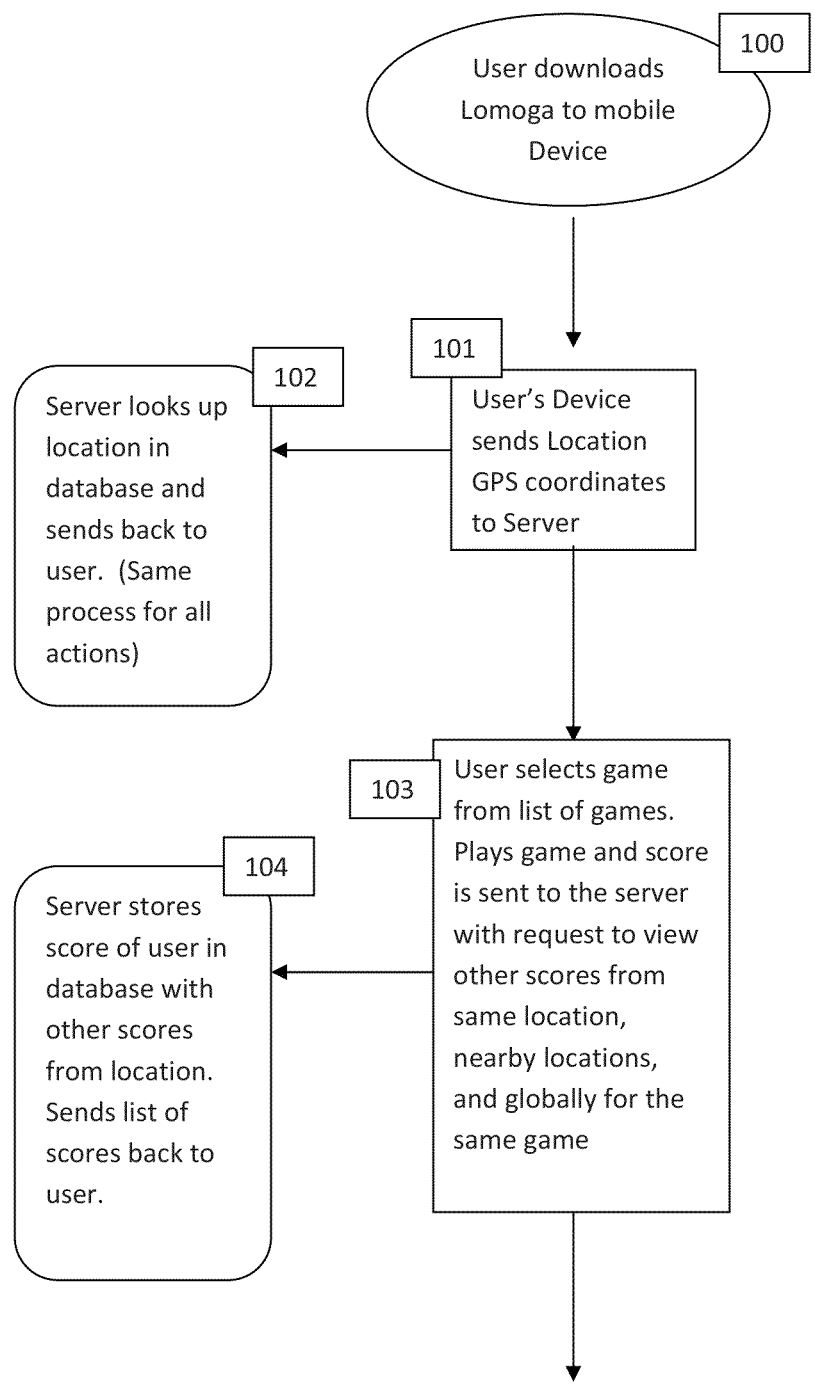

Location Specific High Scores:
Figure #2...continued...
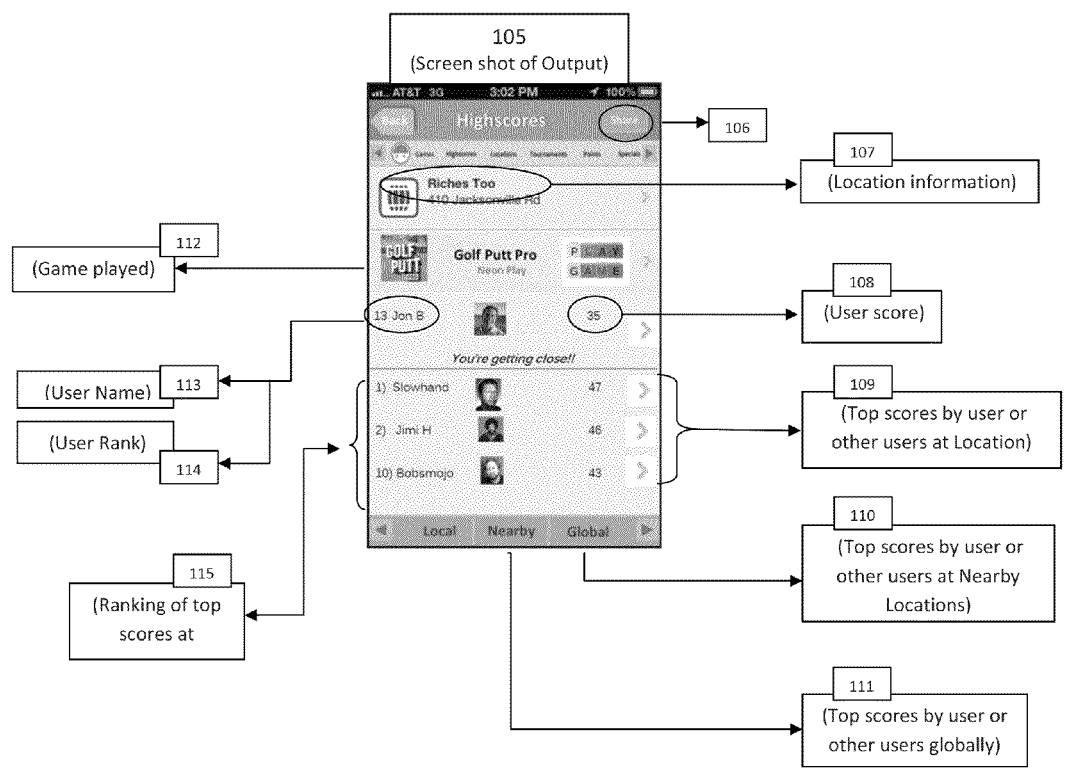

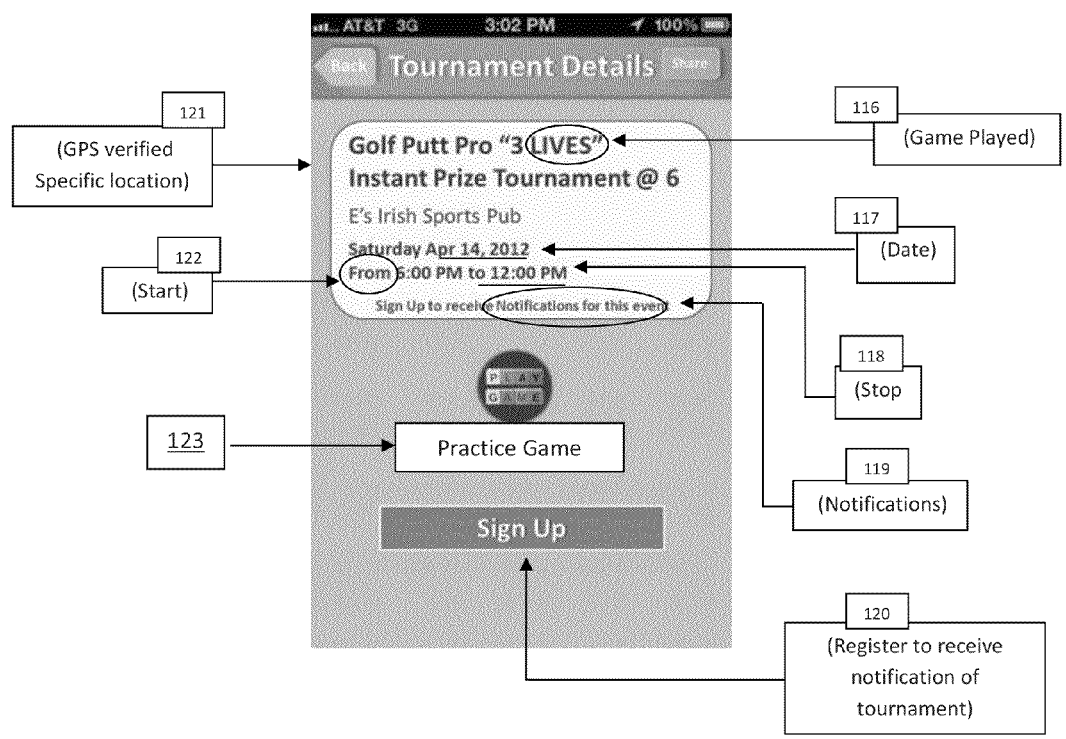
Location Specific Mobile Tournament:
Figure #3

Location Specific Loyalty Points:
Figure #4
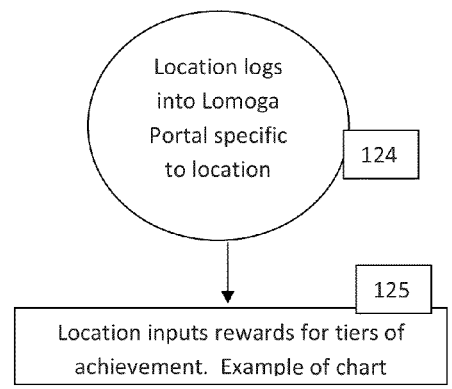
| Loyalty Points Won | Cost of Loyalty Reward | Retail Cost of Reward |
|---|---|---|
| 1000 Points | $1 | $5 |
| 5000 Points | $5 | $15 |
| 10,000 Points | $10 | $30 |
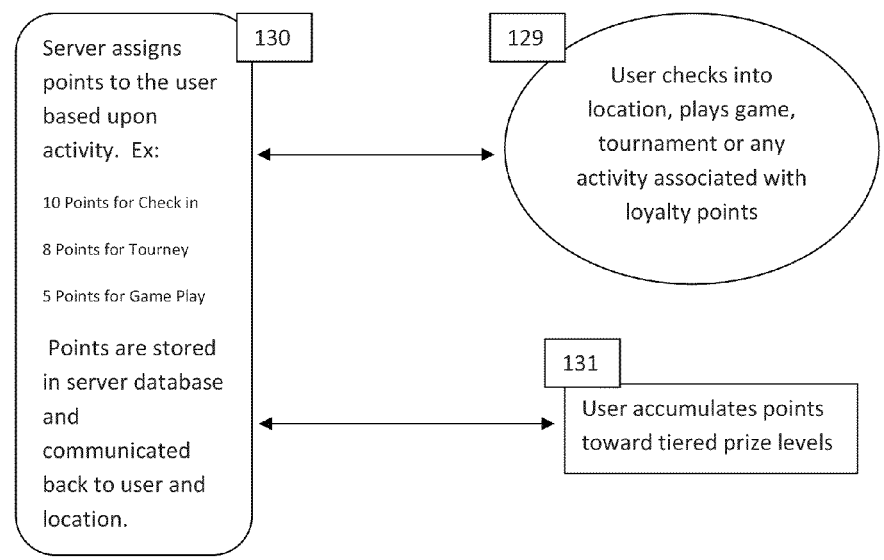

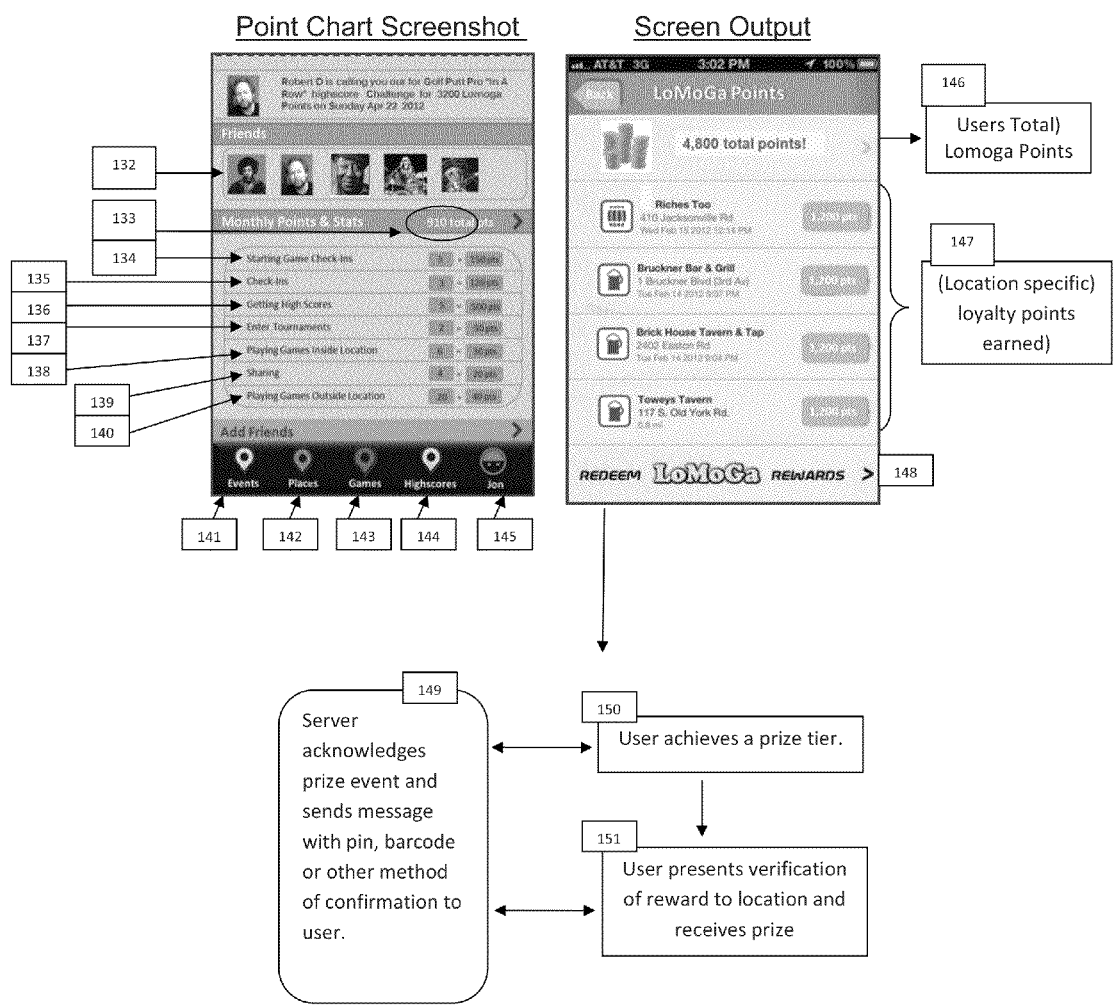
Location Specific Loyalty Points
Figure 4...continued...

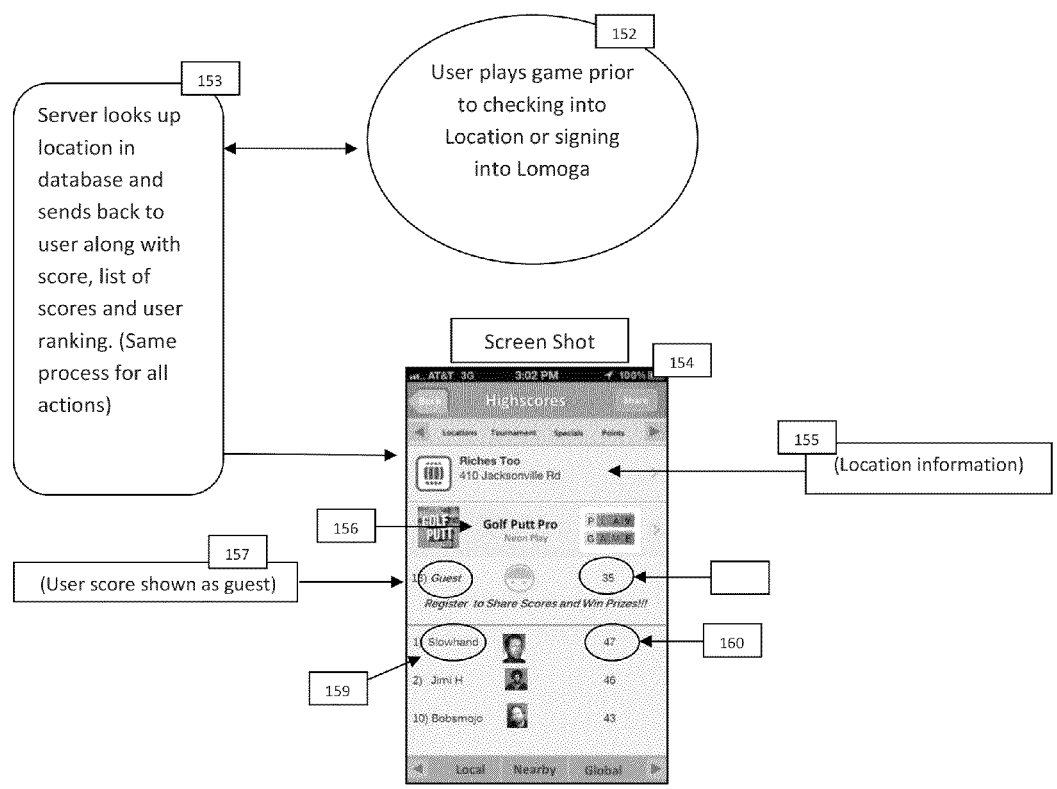
Single Click Check into Location and Play:
Figure #5

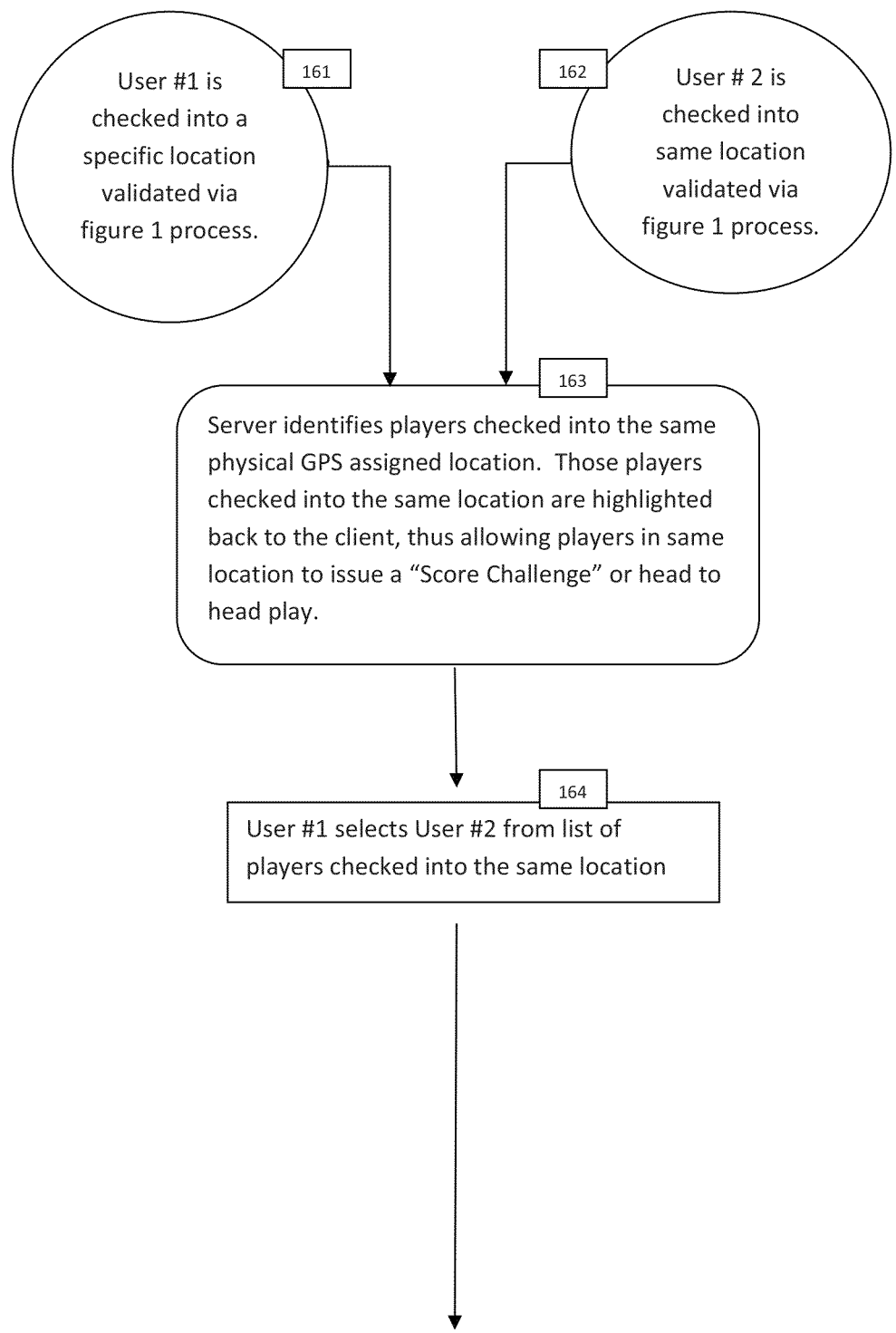

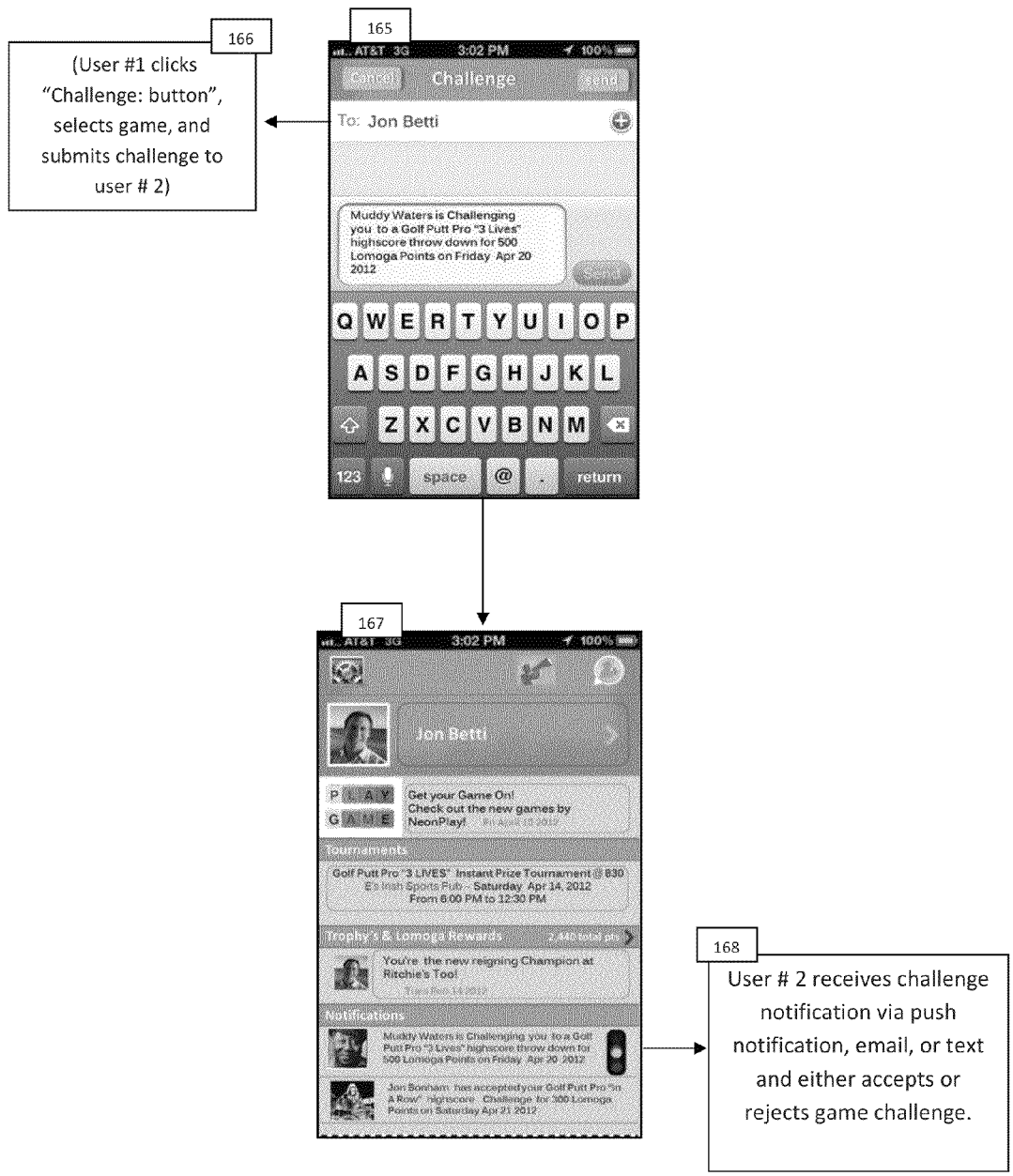

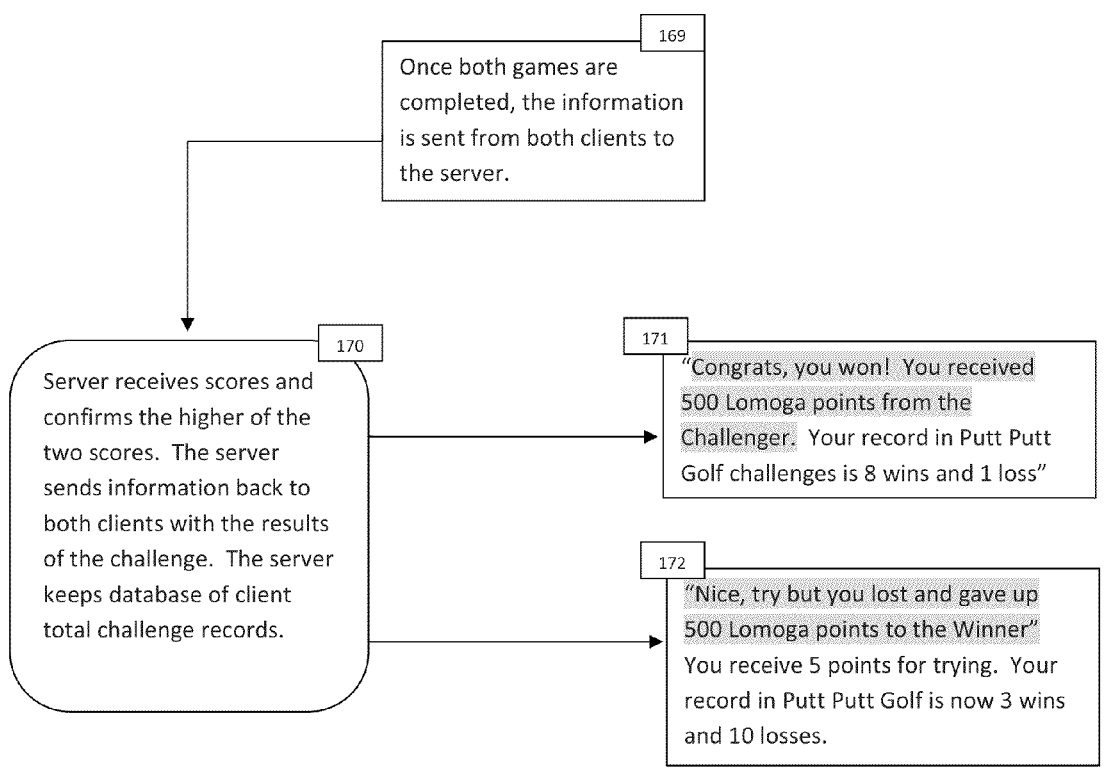

METHOD AND SYSTEM TO PROVIDE LOCATION-BASED COMPETITIVE GAMES, TOURNAMENTS, PRIZES AND HIGH SCORE REPORTS VIA MOBILE DEVICES

RELATED APPLICATION

This application claims the benefit of priority from U.S. Provisional Patent Application No. 61/656,649, filed on Jun. 7, 2012, the entirety of which is incorporated by reference.

BACKGROUND

1. Field of the Invention

The present arrangement relates to a system and method for electronic games. More particularly, the present arrangement relates to a system and method for electronic games, with location specific attributes.

2. Description of Related Art

Coin-operated amusement equipment created an original form of location based competitive gaming systems and competitive gaming culture. Games like Ms. Pac Man™, Pong™, Asteroids™, Golden Tee Golf™, were placed in locations around the world allowing patrons to play, compete for and display high scores and or participate in organized tournaments in those locations.

With the advent of mobile devices, a significant amount of game play has been ported from fixed single player arcade machine to mobile devices. Many of the location based competitive culture, location owner patronage benefits and the player experience have all been greatly diminished or eliminated.

OBJECTS AND SUMMARY

The present invention utilizes mobile devices and a novel mobile application and control system to greatly improve and expand the functionality, location owner benefits, content, and competition and player experience previously provided by outdated location-based amusement equipment.

To this end, the system uses GPS technology enabled by mobile phones and devices to confirm checking into a specific geographic location, play a selected game provided by the system and export a score and data from a mobile game application that is specifically associated with a geographic location, like a bar or coffee shop without the need for an expensive, antiquated, bulky and single player arcade machine. The previous coin-operated equipment technology aggregates and compares a multitude of user scores performed on a single-player-at-a-time unit such as a Ms. Pac Man™ arcade machine at a local pub. The present invention allows multiple simultaneous users at a location to utilize their mobile device with a customized application and control system to simultaneously compete for a high score at a specific location along with providing new player experiences and features provided by the system. The location can provide equivalent entertainment and incentives to all users with a mobile device without the need to purchase, maintain, and find room for a bulky arcade or table top game.

Further, the system is not limited to one player at a time. Many additional and important benefits are realized with this new location based gaming system, in one aspect, the invention creates a virtual scoreboard for all mobile game play conducted at that location transmitted directly to each player's mobile device rather than displayed on the screen of an arcade unit. The mobile device acting as the game playing mechanism with the game scores being exported to a server, where scores are stored in a database with other scores from the same game, scores from other games, and scores from other users. That information is sent from the server back to the location in the form of a scoreboard displayed on each user's device. The user scores can be sorted in ranking order from top to bottom or by using other known methods.

In a further aspect, a user would be able to access, view and interact with the same location based scoreboard data, reports and information from other selected locations without being at the physical location, and with all potential locations where that mobile game was played. These updates and notifications can be provided directly to a user and provide valuable information such as if the player's score has been challenged and or exceeded, for example allowing the user to return to the location to improve their score. Further the location will benefit by potentially attracting the user back to the location remotely to achieve that goal. The scores can be presented in various formats known in the art which could be ranked by location, by region and by a global scoreboard that encompasses all game play regardless of where the game was played. This information could reside in the server database and would be accessible from any location.

In further aspect, the user or player would be able to participate in time-based tournaments conducted on specific games held in specific locations which could be identified and mapped for the local player. These local tournament opportunities could be pushed to the user's mobile device or appear in a "new tournaments" menu when accessing the game application. The notified user could check-in to that physical location to participate in that tournament. The check-in process could validate the presence of the player in the physical location via GPS data from their mobile device as well as verify a further time check requirement to ensure valid system required entry into the event. In other embodiments, a time check requirement for a tournament could be anytime with a certain day, week or the like. The tournament administered by the system, a user or location could begin and conclude at pre-determined times.

In further aspect, the user could initiate and send a "HIGH-SCORE CHALLENGE" to another user that is enabled within the same physical location based on a game provided by the system. A "HIGHSCORE CHALLENGE" is a head to head competition for best score and to earn credit points which could be redeemed in the system environment for a benefit or be redeemed or attributed to an actual item offered on a system enabled game. Through the GPS check-in validation process outlined above, the server would identify players within the same physical location. Players checked into the same location or "live location players" would be highlighted on the client application with the ability to identify each other and be able to utilize the HIGHSCORE CHALLENGE function to compete against each other. In one example embodiment of the invention, a first user could click on the name of a second User, and select the "SCORE CHALLENGE" feature, and then select the game to use as the "High Score Challenge Game", and then select submit the Challenge. The second user would receive a push notification, email or text message alerting the issued live local challenge. Upon mutual acceptance, both players would play the game, with the server further identifying the higher of the two scores as the winner. Loyalty or other points or virtual value items could be wagered associated with the system with each "HIGHSCORE CHALLENGE", with the winner taking those points, value or the like from the losing player.

In a further aspect, users would also be able to issue a HIGHSCORE CHALLENGE to any users or non-users of the system application via email, text message, Facebook™ or Twitter™ or other social media outlets. A non-user who receives a SCORE CHALLENGE would be directed to register with the system and application in order to participate. After registration, a player would be able to accept or reject the invitation.

In another embodiment, users are not required to be checked into a physical location, or be "live at the location" to invite or accept a score a challenge. Users only need to check into the specified score challenge at the location possibly by a certain date and time, to play the game and complete the challenge. Besides the head to head competitive appeal of the score challenge, it is designed to drive players into physical locations.

In further aspect, the user and other users would be able to participate in location based league events. Using the same check-in and pairing process outlined above, user's would be able to select multiple other users to form teams to participate in regularly scheduled matches against other teams held at specific locations possibly based on similar rank, status or skill.

In further aspect of the inventions the user would be able to participate in location based Instant Tournaments. An instant tournament can be started on any instant tournament enabled game by any user or location. Instant Tournaments can be held with 25, 50 or 100 users. The tournament player counter can be initiated with the first entrant's completion of a single game and conclude with the final entrant score based on the preselected maximum number of total user scores. For example, the counter and tournament could start at one and conclude at either the 25$^{th}$, 50$^{th}$ or 100$^{th}$ or more unique user completions of game. At that point, the server would identify the highest score results from the list of entrants and determine a winner. The winner or top performers could receive notifications from the server, earn in system status, perks, points and possibly be able to use the system to claim or redeem an actual, product, value or prize on location or online which could be determined by the system based on level of participation of the location and other factors.

In a further aspect, the location based loyalty program can provide incentives for participating in the service at certain locations which could be conducted via game play and conducted at the physical location. Specific actions, such as game play, tournament play, sharing of scores and other data could be captured via each independent user, sent to the server and shared back to each user. The unique location ID and local site control system portal could allow the location owner to select and input the level of prize to be redeemed rather than via the central control system. The location owner could be charged a fee to access these and other local site controls. In a basic example, upon achieving an accomplishment, the user could receive a notification such as an email, text, voice or other message with a pin number to be inputted into the system portal. A coupon would be generated to be redeemed on premise. Other possibilities exist for location control features options and redemption techniques.

In a further aspect of the invention, because of the prize redemption element that exists within the location based gaming system, additional confirmation of player information could be extended to include their credit card information, email address and potentially drivers' license information to confirm a player's age. Further, verification could be manually verified and administered via the local location and local system controls to enable a patron to participate in the local game. In this case, the local location owner accepts responsibility for verifying the age of the patrons and users.

In further aspect, users who download the system application but do not join or sign-in, can be automatically checked into a location when they finish playing a system integrated and enabled game. The users score information will be sent to the server, assigned to a specific location based upon the users GPS coordinates, compared to known location data and sent back to the user to rank the users score against other scores achieved at that specific location.

BRIEF DESCRIPTION OF THE DRAWINGS

The present invention can be understood through the following description and accompanying drawings, wherein:

FIG. 2 is a flow chart and screen shot example of the application using global positioning technology and software development kit to export a mobile game high score and create a location specific leader board, in accordance with one embodiment;

FIG. 3 is a screen shot example of a mobile game tournament that uses global positioning technology to make the tournament specific to a geographic location, in accordance with one embodiment;

FIG. 4 is a flow chart and screen shot example of a system of a location specific loyalty point program wherein the points are generated by mobile game play, in accordance with one embodiment;

FIG. 5 is flow chart and screen shot example of single click process that checks user into a physical location and initiate game play at the same time, in accordance with one embodiment; and FIG. 6 is a flow chart and screen shot example of a user to user game challenge, in accordance with one embodiment.

DETAILED DESCRIPTION

Figure 1:
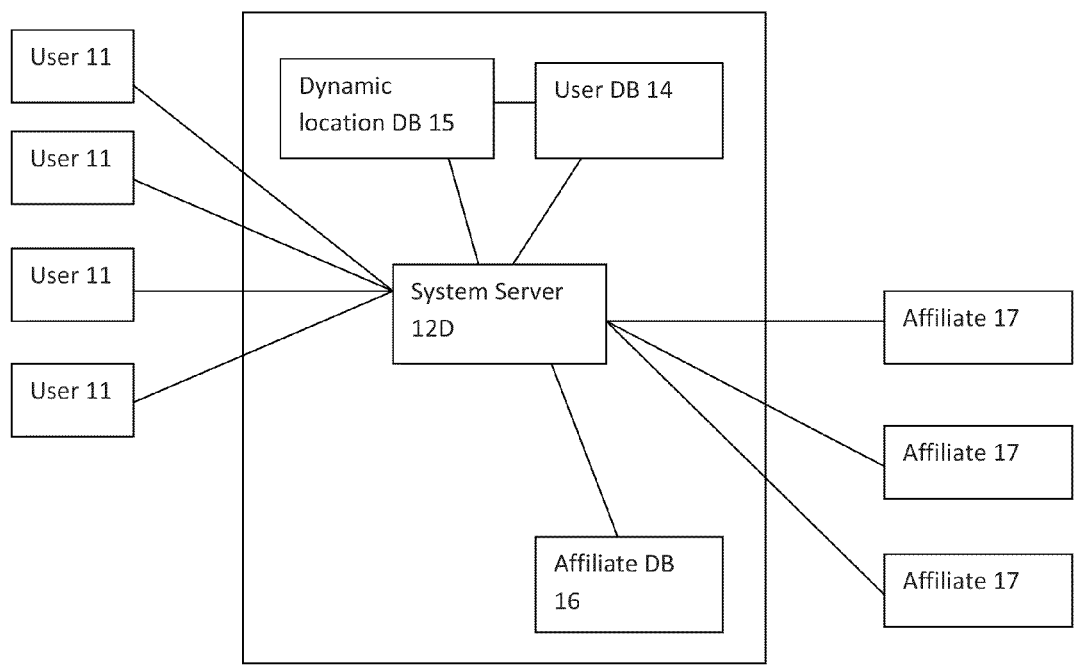
FIG. 1 is an exemplary system diagram in accordance with one embodiment.

In a first exemplary embodiment, FIG. 1 shows an example of a system 10 according to the present arrangement having a first server 12 for administrating incoming and outgoing communications between mobile app users and location based game arrangers to provide for the implementation of a location specific gaming event. One preferred example of a "location specific gaming event" is a game or gaming event that occurs at one or more physical locations, where users play the game or conduct activity on their own mobile devices after checking into the designated location. This allows users to engage in a location specific social environment while utilizing their own physical devices, such as their mobile phones, or portable gaming devices.

To this end, user database 14 is configured to maintain a list of active mobile users 11 of system 10, including normal account information such as name, date of birth, address, communication information, etc. . . . Users 11 are contemplated to be a user possessing a mobile electronic device, such as a mobile phone, pad type computer or other geographic information capable device that executes games/programs.

A dynamic location table 15, either connected to or as a sub part of user database 14 dynamically stores the current (or possibly last known/updated) location of each of the users 11 in database 14, preferably with an indication of the freshness of the location data as well as an indication of whether or not said user 11 has the mobile application, described in more detail below, in an active state, and whether such users 11 are presently engaged in one or more location specific games.

Also shown in FIG. 1 is a game/affiliate database 16 configured to store the relevant data from game/event organizers 17 needed for setting up a location specific gaming event tournament as described in more detail below. In this context, database 16 may include administration and advertising data for an affiliate that would like to run a location specific event or promotion, the content or extent of such event, promotion material to be sent to users 11.

It is understood that FIG. 1 and the above description are only exemplary to show the basic relationship between the system 10, users 11 and game/event organizers 17, and there interaction with server 10 and databases 14 and 16. Additional components, the merger of functions into single components or units, are all within the contemplation of the present arrangement.

Turning to the operation of system 10 in concert with users 11 and organizers 17 it is contemplated that users 11 interact with system 10 via their mobile device. In this context, the arrangement of system 10 includes the operation of a mobile application, arranged to be installed on a user's mobile device and configured to provide an interface for user 11 to communicate with system 10. Organizers 17 may interact with system 10 over any common Internet connection, either mobile or land based as desired.

The following description of the function of system 10 and the associated mobile application for implementing the feature of system 10 are described in more detail below and in the corresponding flow chart and screen shots in FIGS. 2-6. However, it is understood that such descriptions are exemplary in nature and represent one preferred manner for implementing the features of the present invention. It is contemplated that other manners for implementing the features of the invention, including rental lent devices from locations, dedicated mobile/gaming devices, etc. . . . , can likewise be used in the implementation of the present invention.

For example, in one example, the mobile application and all of its functionality would be able to be integrated as a Software Developer Kit (SDK) or file library into third party mobile application enabling the third party mobile application to perform all of the inventions functions. The functionality would reside within the third party application and allow the user and users to experience all elements of the invention without switching between multiple applications.

Beginning with the exemplary description, FIG. 2 is a flow chart giving an exemplary flow chart for the operation of a mobile application designed to create location based high scores and other associated features. The first step, 100 begins with the mobile application being downloaded onto a mobile device of a user, such as user 11. A mobile device may be any communication device including but not limited to a mobile phone, computer, reading device and others possible devices. The application may be downloaded from a variety of sources known in the art.

Once activated, the application at step 101 would send the mobile device's global positioning system (GPS) coordinates to the application's server. At step 102, server 12 would then look up the mobile device's location in the server's location database 15, associate this data with a database of location and/or locations which can be system approved for possible user verification. Once system 10 registered or non-system site is confirmed by system 10 or user 11, system 10 sends confirmation back to the mobile device that the user's device is or "checked in" to the location and the associated localized player, system and game data is retrieved and presented.

It is noted here, that the use of GPS for the location of the mobile devices of users 11 is used for exemplary purposes only for the purposes of illustrating the salient features of the invention. However, any manner for obtaining/using location information for users 11, including, but not limited to Wi-Fi, cellular triangulation, geo-fencing, manual registration, or any other location determining methodology.

In step 103, user 11 then selects from a list of games available on the application possibly specifically associated with that location. The player plays the selected game and the game score is ent to server 12. Server 12 cross references the user's score (at step 104) with other scores associated from the same geographic (GPS assigned) location, as well as nearby GPS assigned locations and to provide further rankings and statistics for all scores played on that specific game within the entire application's network. Server 12 then transmits the score, ranking in the location, ranking in nearby locations and global network wide updated rankings and other data back to users 11 devices. Server 12 stores, evaluates and presents the activity and updated score of user 11 and other data in the location specific and game specific database along with other scores and data from the same location and same game.

FIG. 2, includes an example screenshot 105 showing the output of the process posted to user's 11 mobile device in accordance with one embodiment of the invention. System 10 recognized competitive location name and address is displayed at location 107, illustrating that user 11 is a live potential player and participant at that location. In this basic example, system 10 further provides information relating to the game user 11 selected and played (112), user's 11 associated score (108), user's 11 ranking within that specific geographic location (114) and user's 11 name (113).

Screenshot 105 also shows ranking (115) and top scores (109) of other users 11 who played the same game in the same competitive location. The top player scores sorted by user 11 and or other nearby locations and user 11 scores (110) as well as the top scores from other users 11 for that same game played throughout the application's global network (111). A share button (106) allows user 11 to send his/her user score and ranking as well as other information to others via but not limited to email, text message, twitter and sms.

FIG. 3 is another screenshot showing an example of a location specific mobile tournament as previously described. The users' tournament play is enabled and verified, by using the GPS or other local validation techniques for the check-in process outlined in FIG. 2, to all mobile devices and associated players 11 that are within the specified location (121). The tournament can be held on a specific date (117), with a specific start time (122) and a specific end time (118), but is not limited to this time requirement or method. The tournament is to be competed on a certain game and possibly player skill or status level or game type (116) available within the mobile application network. The resultant local users' tournament scores are transmitted to the application user 11 as outlined in FIG. 2. Server 12 may evaluate and can categorize the submitted scores and player data by location, game, time and date submitted. The score information is submitted back to the users' 11 mobile devices with the tournament results clearly outlined. During an actual tournament, live user 11 data processing and updating may be conducted by system 10 in order to provide the most accurate status information which is pushed to the players and fans.

The tournament is posted on the network hours, days, weeks and months in advance of the actual start date. Users 11 are able to virtually sign up (120) for the tournament and receive various notifications (119) of the upcoming event via email, text, twitter, sms and other messaging types.

FIG. 4 illustrates an exemplary process for a location owner 17 or administrator to create and administer a location specific loyalty points or other incentive program as well as an example of system 10 facilitating the loyalty point or other described prize or earned value redemption. A location can be any identifiable establishment or area that is public or private that is in the business of providing a product or service. A location that uses the application and has enabled localized system controls, potentially for a fee, could use a location specific password to log into the location portal (124). Within the location specific portal, the location can input (125); a reward system for activity conducted within their location via the mobile application and associated control system. The exemplary reward system (126) is a matrix that assigns the points or other perceived user value won for actions conducted via the application associated with a system identified competitive location that includes but is not limited to: checking in, playing a game, achieving a high score, sharing a high score, entering a tournament, winning a tournament, or recommending the application to friends via system 10. In this exemplary payout method, the matrix correlates the points won by user 11 in a location (126), with the location's actual cost (127) of a reward to be given at the point level and the retail cost (128) of the prize to be redeemed at the achievement of inputted loyalty points.

Step 129 on FIG. 4 illustrates a step that combines the above described actions of user 11 checking into a location, playing a game, tournament or any other activity that is associated with earning loyalty points or the like on the application and associated system 10. At step 130 user's 11 actions on the application are transmitted to server 12 where the server's system assigns the points to user 11 based upon the activity completed. The points are stored in server 12 database (e.g. databases 14 and/or 16) and communicated back to user 11 and the location (17). At step 131, user 11 accumulates points toward the exemplary tiered prize levels (126) created by the location where those points are earned.

In an alternate embodiment, users 11 can earn points or other user perceived or actual monetary remuneration that are not specific to one location 17 but are network wide loyalty points, status or credits that can be redeemed toward prizes offered by system or local advertisers and sponsor.

FIG. 4 also contains a screen shot showing an example of a user 11 earned point value chart derived from the application and system. Item (133) shows an example of a user 11 of the application's monthly points, stats and total loyalty points earned. The loyalty point or other earned system credits to action chart provides examples of point of earning methods. Item (134) is an example of loyalty points earned for starting a game upon checking into a location. Item (135) is an example of user 11 points for checking into locations. Item (136) is an example of user 11 points for getting a high score on a game. Item (137) is an example of user 11 earning points for playing in a tournament. Item (138) is an example of user 11 earning points for playing a game inside a location. Item (139) is an example of user 11 earning points for sharing (i.e. at step 105). Item (140) is an example of user 11 points for playing games outside of a location. Points can be earned for various actions and achievements not specifically mentioned in the example.

FIG. 4 also shows the bottom navigation bar for the application. The navigation bar includes tabs for events (141), places (142), games (143), high scores (144) and for user's 11 own profile (145). On the other screenshot titled "Lomoga" points, (146) shows the user's total points for all points earned on the application network. Item (147) displays examples of locations where points were earned and where points can be redeemed. Points earned in specific locations can be redeemed in those specific locations or by other methods known in the art. Total points earned can be redeemed at a network wide sponsor (148).

FIG. 4 continues with a flow chart with step 150 illustrating a user 11 of the application achieving a predetermined achievement threshold illustrated as by a number of points that would qualify that user 11 for a prize. In this example, the achievement and prize are specific to a geographic GPS assigned location. In step 149, user 11 mobile device sends user data to server 12 and system 10 which determines and reports that that a prize tier has been achieved by user 11. Server 12 acknowledges the prize event by cross referencing the point matrix of that specific location with user 11 point total. Server 12 then sends a message with pin, barcode or other method of confirmation or redemption method back to user 11 mobile device. At step 151, user 11 presents the prize verification code to the location 17, which validates the code and presents the prize to user 11. Other redemption methods are also possible.

In a different embodiment where the points to be redeemed are not location specific, the same process outlined in FIG. 4 could occur but with the application and system 10 assigning a point to reward matrix as well handling the presentation and redemption method of the reward to user 11.

FIG. 5 is flow chart and screen shot showing an example of single click process where a user 11 of the application initiates and finishes a selected game and checks into the location 17 simultaneously. The first step of the flow chart 152 shows the process of user 11 playing a game on the application without having logged into the application or checked into a location 17 before selecting the game to play. User 11 completes the game and sends the score to the application's server 12 at step 153. Server 12 looks up the location 17 in the affiliate/location database 16 and sends data back to user 11 mobile device relating to the user's score and ranking in that location 17 and user 11 ranking relative to all other scores specific to that location 17, nearby and network wide. User 11 is checked into the location once that information is transmitted back to user 11 mobile device.

FIG. 5 also shows an exemplary screenshot 154 of how the application based on system data would represent the information on user 11 mobile device. The screenshot shows location information (155), the game that was played on the application (156), user 11 who is identified as a GUEST since the user did not log in (157), user 11 score (158), user 11 ranking (159) and the top user's by score in that location (160).

In another embodiment, system 10 may log a registered user 11 of the application automatically into the application after completing a game enabled with the application. In that scenario, the user's user name would appear in the place of GUEST.

FIG. 6 is a flow chart and screen shot showing an exemplary implementation of a location specific Challenge within the application. The flow chart begins at step 161 with a first user 11 checking into a specific location 17 by the process outlined above in FIG. 2, FIG. 5 or any other known or described method of checking in. At step 162, the same method of checking into a location within the application is conducted by a second user 11'. At step 163, the application's server 12 identifies a first user 11, a second user 11' and any other users 11" of the application that have successfully checked into the same physical GPS assigned location 17 (that is implementing the game/tournament. System 10 and the application present highlights of that information back to all users 11 checked into that location 17. Users 11 in the specific location can now view, by either the user name being highlighted, an asterisk or any other means of identification, who and how many of the application users 11 are live in the same location 17.

In the flow chart example, at step 164 a first user 11 identifies that a second user 11' is in the same location 17, selects a second user 11' from a list of users 11" potentially ranked by skill or status also checked into the same location 17. Screenshot 165 is an exemplary screenshot from a user 11 mobile device application, showing the "Challenge" message being issued from one user 11 to another. At step 166 a first user 11 selects the "Challenge" button on the application, selects a game for the Challenge and then submits the Challenge to a second or third user 11". A Challenge icon 167 can be located on the top area of the application. At step 168, a Challenge notification can be sent either via a push notification, email, text or any other available means of communication. The second 11' or third user 11" has the option to accept or reject the challenge. The Challenge in this example could determine who can get the higher score on one attempt playing a specific game within the application. Other challenge requirements could be created and suggested. Head to head player Challenges are not limited to high score challenges and may include other variations of competitive head to head interaction.

FIG. 6 continues with the method whereby at step 169 both a first user 11 and second user 11' complete their game challenge on the application. Both of their associated scores and achievement data are transmitted to server 12 and control system 10. At step 170, server 12 receives the score data, confirms that the score data were transmitted from the geographic location 17, determines the higher or better of the two or more scores or game performances. System 10 sends the results and other associated information back to the users 11 devices. Server 12 could also save this data and maintain a database (such as database 14) and provide reporting of all users 11 challenge statistics and associated data. In this example, at step 171, a message to a first winning user 11 could congratulate the winner; attribute the winning user 11 the total points won and gained from the challenge to the winners account and also update their challenge history statistics within the reporting system (e.g. in database 14). At step 172, the "loser" of the challenge could receive fewer or lose loyalty, status, or other in-game currency and also receive a negative update to their challenge history statistics. In a similar embodiment, system 10 and application could allow users 11 to issue Challenges to other users 11 whether or not both users where checked into the same location 17. The Challenge would be consummated upon the completion of both users' game.

Throughout the above descried Challenge process, users 11 may optionally be able to view the same location based scoreboard data, reports, special offers, advertising, discounts, tournaments, notifications and all data from the application on any monitor or display within the location 17 enabled to interface with a mobile device. Location 17 would be able to utilize the displays to draw further attention and promotion to the mobile application and its features.

In a final embodiment of the invention, system 10 and application could allow users 11 to wager their own loyalty points against another user 11' loyalty points or other in game property or value, in a Challenge. The winner of the Challenge would receive the loser of the Challenge's loyalty points credited to their user 11 total loyalty points. Conversely, the loser of the challenge could also have the agreed upon wagered loyalty points deducted from their user 11 point total. System 10 and the associated application could set parameters limiting the amount and frequency of the points wagered in the Challenge. System 10 and the associated application can allocate the points to the winner and loser at the completion of the Challenge.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for implementing a location specific gaming event, said system comprising:
a server and databases for maintaining a plurality of user accounts associated with a plurality of users, said server and database configured to maintain location information for said plurality of users;
said server and databases further configured to maintain at least one affiliate account, with at least one geographic location associated with said affiliate account;
wherein said system is configured to receive at least one request from said at least one affiliate account to arrange for a location specific gaming event at said at least one geographic location associated with said affiliate account,
said system further configured to receive at least one communication from mobile devices of at least two of said plurality of users when said mobile devices are located at said geographic location,
said server of said system configured to administer said location specific gaming event to said users after said system receives said communication that said users are at said geographic location,
wherein said system is further configured to administer a user challenge, including monitoring of a plurality of users at said geographic location simultaneously engaged in said location specific gaming event, said challenge including administering a score board, viewable by said users engaged in said location specific gaining event,
said user challenge including the issue of a competitive challenge function, where said system may receive a request for a performance challenge from any one or more of said users to be delivered to one or more other users engaged in said location specific gaming event, where said system is configured to allow a user at a location specific gaming event to issue said performance challenge to one or more non-active users, non-users, not currently engaged in said location specific gaining event, via any one of a mobile device, social media, e-mail or text message.

2. The system as claimed in claim 1, wherein system is configured to receive GPS location information, enabled by said mobile devices of said users to confirm said user at said geographic location.

3. The system as claimed in claim 2, wherein said system is configured to receive either one of time verification data or user number verification data with said received GPS location information.

4. The system as claimed in claim 1, wherein said location based score board is updated by user events and delivered to said mobile devices of said user.

5. The system as claimed in claim 1, wherein said scoreboard may be configured to include anyone of a legacy high score indication, ranking information, regional information including data about other gamers engaged in a similar game to the game at said location specific gaming event.

6. The system as claimed in claim 1, wherein said system is configured to provide loyalty points to said users engaged in said location specific gaming events.

7. The system as claimed in claim 6, wherein said system is configured to allow users to wager loyalty points in either one of said performance challenges or said location specific gaming events.

8. The system as claimed in claim 1, wherein said system is configured to provide said affiliate account the ability to advertise a reward to be distributed to one or more users for engaging in said location specific gaming event.

9. The system as claimed in claim 1, wherein said system is configured to send gaming event invitations to said users on behalf of said affiliate accounts.

10. The system as claimed in claim 1, wherein said system is configured to administer said location specific gaming event as a time-based tournaments at a particular geographic location of an affiliate.

11. The system as claimed in claim 10, wherein said system is configured to distribute either one of or both invitations and location information to said users for said time-based tournaments.

12. The system as claimed in claim 10, wherein said time-based tournaments at a particular geographic location of an affiliate is a league event.

13. The system as claimed in claim 12, wherein said time-based tournaments at a particular geographic location includes a min/maximum number of competitors.

14. The system as claimed in claim 10, wherein said time-based tournaments at a particular geographic location of an affiliate is an instant tournament.

15. The system as claimed in claim 1, wherein said user can participated in a remote location specific gaming event on their mobile device prior to verification of the user's required GPS location data wherein said system is further configured to provide a transfer of said user's game prior to verification to the system after verification of the user's required GPS location data.

16. A system for implementing a location specific gaming event, said system comprising:
　a server and databases for maintaining a plurality of user accounts associated with a plurality of users, said server and database configured to maintain location information for said plurality of users;
　said server and databases further configured to maintain at least one affiliate account, with at least one geographic location associated with said affiliate account;
　wherein said system is configured to receive at least one request from said at least one affiliate account to arrange for a location specific gaming event at said at least one geographic location associated with said affiliate account,
　said system further configured to receive at least one communication from mobile devices of at least two of said plurality of users when said mobile devices are located at said geographic location,
　said server of said system configured to administer said location specific gaining event to said users after said system receives said communication that said users are at said geographic location,
　wherein said system is configured to administer said location specific gaming event as a time-based tournaments at a particular geographic location of an affiliate, said time based tournament is administered by said system, initiated with a first users completion of a single game of said location specific gaming event and terminates with a final entrant score of said same single game of said location specific gaming event based on a preselected maximum number of total user scores.

\* \* \* \* \*

UNITED STATES PATENT AND TRADEMARK OFFICE
CERTIFICATE OF CORRECTION

| | | |
|---|---|---|
| PATENT NO. | : 9,272,211 B2 | Page 1 of 1 |
| APPLICATION NO. | : 13/871459 | |
| DATED | : March 1, 2016 | |
| INVENTOR(S) | : Betti et al. | |

It is certified that error appears in the above-identified patent and that said Letters Patent is hereby corrected as shown below:

Claims
Column 12, Claim 16, Line 21: The word "gaining" between the words "specific" and "event" should read as "gaming"

Signed and Sealed this
Thirty-first Day of May, 2016

Michelle K. Lee
*Director of the United States Patent and Trademark Office*